(12) United States Patent
Zeng (10) Patent No.: US 10,109,434 B2
(45) Date of Patent: Oct. 23, 2018

(54) STRUCTURE OF ELECTRONIC DEVICE KEY

(71) Applicant: SMARTISAN DIGITAL CO., LTD., Beijing (CN)

(72) Inventor: Lingjun Zeng, Beijing (CN)

(73) Assignee: Smartisan Digital Co., Ltd., Beijing (CN)

( * ) Notice: Subject to any disclaimer, the term of this patent is extended or adjusted under 35 U.S.C. 154(b) by 0 days.

(21) Appl. No.: 15/317,242

(22) PCT Filed: May 29, 2015

(86) PCT No.: PCT/CN2015/080295
§ 371 (c)(1),
(2) Date: Dec. 8, 2016

(87) PCT Pub. No.: WO2015/188702
PCT Pub. Date: Dec. 17, 2015

(65) Prior Publication Data
US 2017/0125188 A1     May 4, 2017

(30) Foreign Application Priority Data

Jun. 11, 2014   (CN) .......................... 2014 1 0258068

(51) Int. Cl.
*H01H 13/705*     (2006.01)
*B29C 65/48*      (2006.01)
(Continued)

(52) U.S. Cl.
CPC ............. *H01H 13/14* (2013.01); *B29C 65/48* (2013.01); *H01H 13/705* (2013.01); *B29L 2031/34* (2013.01)

(58) Field of Classification Search
CPC ...... H01H 13/14; H01H 13/705; H01H 13/88; H01H 2221/006; H01H 2223/022;
(Continued)

(56) References Cited

U.S. PATENT DOCUMENTS

| | | | |
|---|---|---|---|
| 2009/0159412 A1 | 6/2009 | Liu et al. | |
| 2009/0159416 A1 | 6/2009 | Tseng et al. | |
| 2012/0206361 A1* | 8/2012 | Chen .................... | H01H 13/705 345/168 |

FOREIGN PATENT DOCUMENTS

| | | |
|---|---|---|
| CN | 2466778 Y | 12/2001 |
| CN | 101471194 A | 7/2009 |

(Continued)

OTHER PUBLICATIONS

State Intellectual Property Office as International Searching Authority, International Search Report for PCT Application No. PCT/CN2015/080295, dated Aug. 21, 2015.

*Primary Examiner* — Vanessa Girardi
(74) *Attorney, Agent, or Firm* — Honigman Miller Schwartz and Cohn LLP; Matthew H. Szalach; Jonathan P. O'Brien (57) ABSTRACT

A key of an electronic device and an electronic device applying the key are provided. The key includes a key cap and a substrate arranged under the key cap, the key cap and the substrate are formed separately, and the substrate is adhesively attached to an underside of the key cap with an adhesive.

14 Claims, 5 Drawing Sheets

(51) Int. Cl.
*H01H 13/14* (2006.01)
*B29L 31/34* (2006.01)

(58) Field of Classification Search
CPC ......... H01H 2227/01; H01H 2229/028; H01H 2211/004; B29C 65/48
USPC .................. 200/341, 314; 29/592.1, 622
See application file for complete search history.

(56) References Cited

FOREIGN PATENT DOCUMENTS

| | | |
|---|---|---|
| CN | 104021966 A | 9/2014 |
| GB | 2465243 A | 5/2010 |
| TW | I431651 B | 3/2014 |

* cited by examiner

STRUCTURE OF ELECTRONIC DEVICE KEY

The present application is a National Stage application of PCT International Application No. PCT/CN2015/080295, filed on May 29, 2015, which claims priority to Chinese Patent Application No. 201410258068.X, titled "ELECTRONIC DEVICE KEYS AND ELECTRONIC DEVICE", filed on Jun. 11, 2014 with the State Intellectual Property Office of the People's Republic of China, both of which are incorporated herein by reference in their entireties.

TECHNICAL FIELD

The present disclosure relates to the technical field of an electronic device, and particularly to an electronic device and a key of an electronic device.

BACKGROUND

Figure 1:
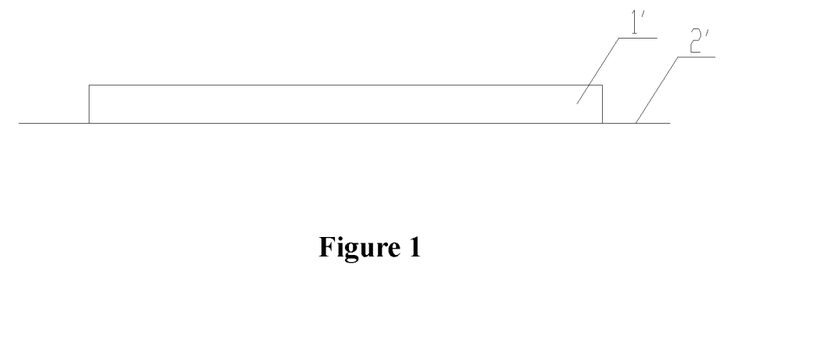
FIG. 1 is a schematic structural diagram of a key of an electronic device in the conventional technology.

A key is an important constituent part of an electronic device such as a mobile. Reference is made to FIG. 1, which is a schematic structural diagram of a key of an electronic device in a conventional technology. The key includes a key cap 1' and a substrate 2'. The key cap 1' is a component playing a role of decoration and press function on the top of the key. The substrate 2' is connected to a circle under the key cap 1', whose area is a little more than an area of the key cap 1'. The substrate 2' is a component for fixing the key cap 1' on the electronic device to prevent the key cap 1' from falling off.

The key cap 1' and the substrate 2' are formed integrally in conventional technology. It is difficult to form an integral key with many special materials, for example, using glass to manufacture integrally the key cap 1' and the substrate 2' has a complex craftwork, and structural strength of the integral key cap 1' and substrate 2' is low. Therefore, selection of a material of the key is quite limited due to the limitation of the craftwork. Generally only a plastics key or a metal key may be selected. For the plastics key or the metal key, generally they need to be made very thick to satisfy requirement on strength or the like. A relatively large space is needed to arrange the key, which is not consistent with a design concept of an electronic device with a small size and light mass.

In view of this, for the above technical problem, it is urgent to optimize the key of the electronic device in the conventional technology, so that the selection of the material is flexible and a thickness and an occupation of the space are reduced under a premise that the requirement on strength or the like is satisfied.

SUMMARY

An object of the disclosure is to provide a key of an electronic device. The key has an adhesively-attached separated structure, which may has flexible selection of a material and a small thickness under a premise that requirement on strength or the like is satisfied. In addition, another object of the disclosure is to provide an electronic device applying the above key.

In order to solve the above problem, the disclosure provides a key of an electronic device, which includes a key cap and a substrate arranged under the key cap. The key cap and the substrate are formed separately, and the substrate is adhesively attached to an underside of the key cap with an adhesive.

In above structure of the key, the key cap and the substrate are formed separately and are adhesively attached with the adhesive, compared with the conventional technology in which the key cap and the substrate are formed integrally, a machining craftwork is simplified. And the key cap and the substrate may not be limited to being made of the same material, the selection of the material is flexible. For example, the key cap may be a metal key cap, and the substrate may be made of many other kinds of materials which may satisfy the strength requirement as well as be thin, for example the substrate may be a carbon fiber substrate, a glass substrate, a rubber substrate or a plastics substrate. Materials such as a thermo plastic polyurethane elastomer, a Kevlar fiber material may be further adopted. In view of this, in the above key of the electronic device, the key cap and the substrate are formed separately, flexible selection of the material of the key cap and the substrate is achieved, and a relatively small thickness to ensure enough strength is further achieved, and the key of the electronic device according to the disclosure has a relatively small size and an installation space is saved.

Preferably, the substrate is a carbon fiber substrate, a glass substrate or a rubber substrate.

Preferably, the substrate includes a first substrate sheet and a second substrate sheet arranged under the first substrate sheet. The first substrate sheet has a frame structure with a hollow part. The key cap is matched with the hollow part. The key cap, the first substrate sheet and the second substrate sheet are adhesively attached with the adhesive.

Preferably, the first substrate sheet and the second substrate sheet are made of a same material or made of different materials.

Preferably, multiple first grooves extending upward from a bottom surface of an inside of the frame structure of the first substrate sheet are arranged at the bottom surface.

Preferably, a cross section of each of the first grooves is rectangular. A square wave shaped structure is formed on the bottom surface of the inside of the frame structure of the first substrate sheet.

Preferably, multiple second grooves extending downward from a top surface of the second substrate sheet corresponding to an inside of the frame structure of the first substrate sheet are arranged at the top surface.

Preferably, a cross section of each of the second grooves is rectangular. A cross section of each of the second grooves is rectangular. A square wave shaped structure is formed on the top surface of the second substrate sheet corresponding to the inside of the frame structure of the first substrate sheet.

Preferably, the adhesive includes a first adhesive and a second adhesive. The first adhesive is arranged between the first substrate sheet and the second substrate sheet, and the first adhesive has a frame structure matched with a shape of the first substrate sheet. The second adhesive is arranged inside the frame structure of the first substrate sheet.

By adopting above structure, in an adhesive attaching process, firstly, the first substrate sheet, the first adhesive and the second substrate sheet may be adhesively attached to form the substrate. Then the second adhesive is arranged at the hollow part inside the frame structure of the first substrate sheet. And then the key cap is adhesively attached to the hollow part of the first substrate sheet to form the key. The second adhesive can well adhesively attach the key cap and an inside of the frame structure of the substrate. In view of this, strength of the substrate may be ensured by adopting double substrate sheets and close adhesive attaching of the key is implemented by double layer adhesives.

Preferably, the first adhesive is a solid adhesive film. The adhesive film has a frame structure matched with a shape of the first substrate sheet. Multiple concave parts concaving outward are arranged at an inside of the frame structure of the adhesive film.

Preferably, a cross section of each of the concave parts is rectangular. A square wave shaped structure is formed on the inside of the frame structure of the first adhesive.

An electronic device is further provided by the disclosure, which includes a control panel and a key arranged on the control panel. The key is the key of the electronic device described above.

As the above key of the electronic device has the above technical effect, so the electronic device applying the key has the same technical effect, which is not described here.

BRIEF DESCRIPTION OF THE DRAWINGS

In FIG. 1: key cap 1'; substrate 2'. In FIG. 2 to FIG. 8: key cap 1; substrate 2; first substrate sheet 21; first groove 211; second substrate sheet 22; adhesive 3; first adhesive 31; concave part 311; second adhesive 32.

DETAILED DESCRIPTION OF THE EMBODIMENTS

A core of the disclosure is to provide a key of an electronic device. The key has an adhesively-attached separated structure, which may has flexible selection of a material and a small thickness under a premise that requirement on strength or the like is satisfied. In addition, another core of the disclosure is to provide an electronic device applying the above key.

In order to make those skilled in the art understand the technical solutions of the disclosure better, hereinafter the disclosure is further described in detail in conjunction with the drawings and specific embodiments. It should be noted that, a direction word "inside" in the disclosure refers to a direction that a surround of a frame converges into its center. It should be understood, the direction word is set on a basement of the drawings of the specification. Appearance of the direction word should not affect a protection scope of the disclosure.

In a specific embodiment, the disclosure provides a key of an electronic device, which includes a key cap 1 and a substrate 2 arranged under the key cap 1. The key cap 1 and the substrate 2 are formed separately. The substrate 2 is adhesively attached to an underside of the key cap 1 with an adhesive 3.

In above structure of the key, the key cap 1 and the substrate 2 are formed separately and are adhesively attached with the adhesive, compared with the conventional technology in which the key cap and the substrate are formed integrally, a machining craftwork is simplified. And the key cap 1 and the substrate 2 may not be limited to being made of the same material, the selection of the material is flexible. For example, the key cap 1 may be a metal key cap, and the substrate 2 may be made of many other kinds of materials which may satisfy the strength requirement as well as be thin, for example the substrate 2 may be a carbon fiber substrate, a glass substrate or a rubber substrate. Materials such as a plastics substrate, a thermo plastic polyurethane elastomer, a Kevlar fiber material may be further adopted. In view of this, in the above key of the electronic device, the key cap 1 and the substrate 2 are formed separately, flexible selection of the material of the key cap and the substrate is achieved, and a relatively small thickness to ensure enough strength is further achieved, and the key of the electronic device according to the disclosure has a relatively small size and an installation space is saved.

Figure 2:
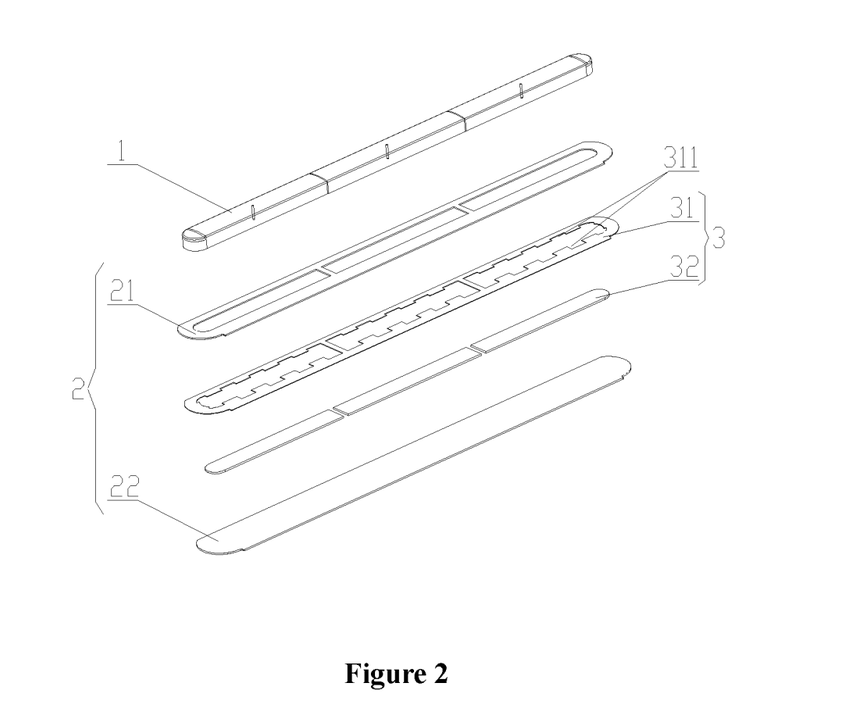
FIG. 2 is a decomposition diagram of a key of an electronic device according to an embodiment of the disclosure.
Figure 3:
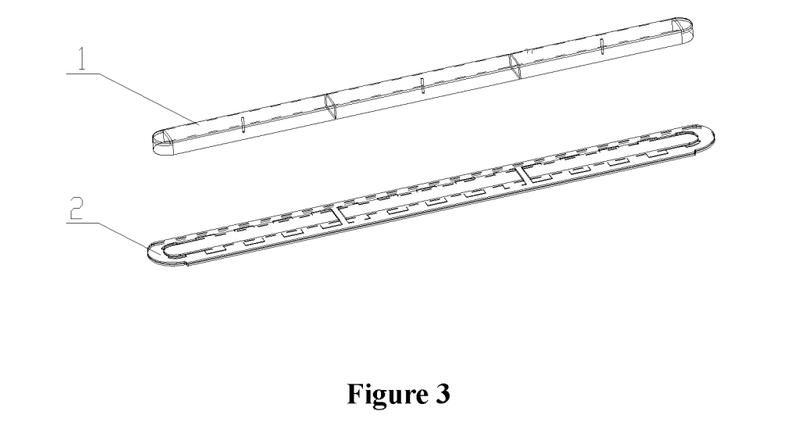
FIG. 3 is a schematic structural diagram of a substrate formed by adhesively attaching all parts of the substrate in FIG. 2.
Figure 4:
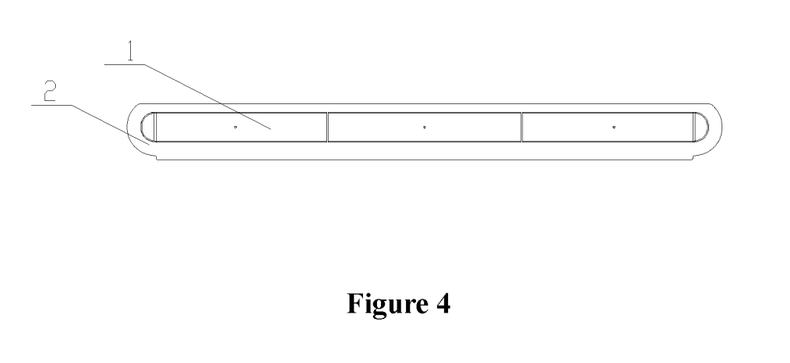
FIG. 4 is a top view of a key formed by adhesively attaching a substrate and a key cap in FIG. 3.
Figure 5:
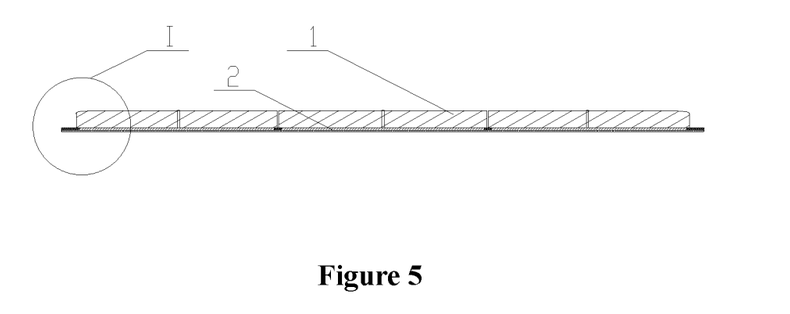
FIG. 5 is a main sectional view of the key in FIG. 4.
Figure 6:
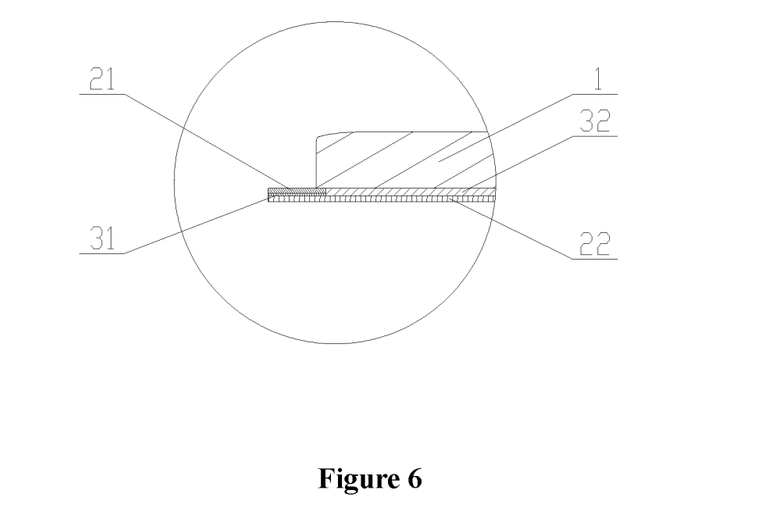
FIG. 6 is a partial enlarged view of the part shown in I location in FIG. 5.

Reference is made to FIG. 2 to FIG. 6. FIG. 2 is a decomposition diagram of a key of an electronic device according to an embodiment of the disclosure; FIG. 3 is a schematic structural diagram of a substrate 2 formed by adhesively attaching all parts of the substrate 2 in FIG. 2; FIG. 4 is a top view of a key formed by adhesively attaching a substrate 2 and a key cap 1 in FIG. 3; FIG. 5 is a main sectional view of the key in FIG. 4; FIG. 6 is a partial enlarged view of the part shown in I location in FIG. 5.

In a specific solution, as shown in FIG. 2 and FIG. 3, the above substrate 2 includes a first substrate sheet 21 and a second substrate sheet 22 arranged under the first substrate sheet 21. The first substrate sheet 21 has a frame structure with a hollow part. The key cap 1 is matched with the hollow part. The key cap 1, the first substrate sheet 21 and the second substrate sheet 22 are adhesively attached with the adhesive 3.

By adopting above structure, in an adhesive attaching process, firstly, the first substrate sheet 21 and the second substrate sheet 22 may be adhesively attached. Then the key cap 1 is adhesively attached to the hollow part of the first substrate sheet 21 to form the entire key. So the frame structure with the hollow part of the first substrate sheet 21 can prevent the adhesive 3 from flowing to an outside of the key cap 1, that is, overflow of an adhesive in an adhesive attaching process is avoided. In addition, strength of the substrate 2 may also be enhanced by adopting a double layer adhesive attaching structure.

The above first substrate sheet 21 and the second substrate sheet 22 may be made of a same material. Of course, in consideration of factors such as the strength and the thickness of the substrate, the first substrate sheet 21 and the second substrate sheet 22 may also be made of different materials. For example, the first substrate sheet 21 is made of rubber and the second substrate sheet 22 is made of plastic.

Figure 7:
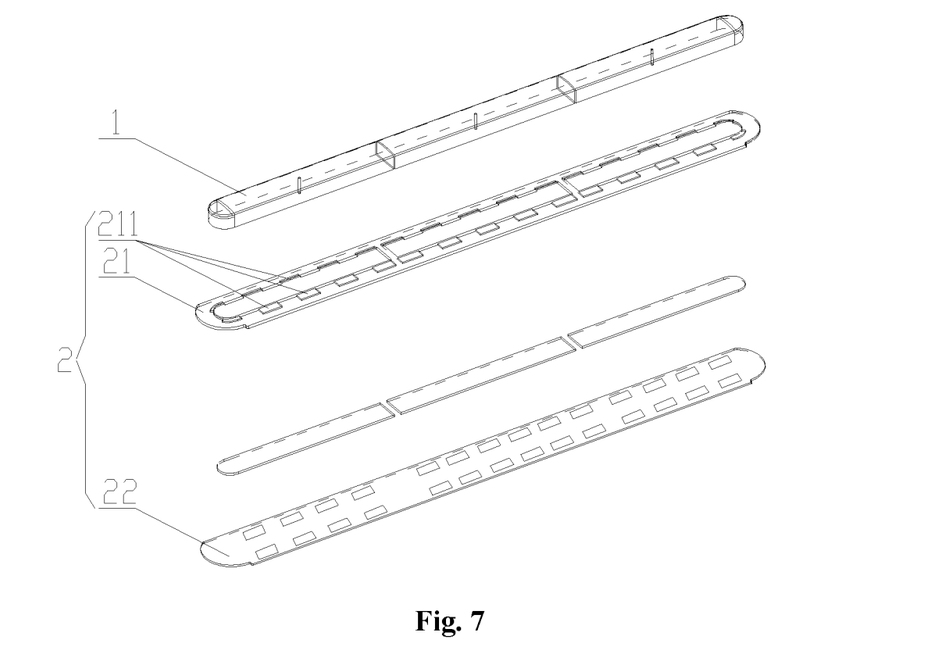
FIG. 7 is a schematic structural diagram of a key according to an embodiment of the disclosure.
Figure 8:
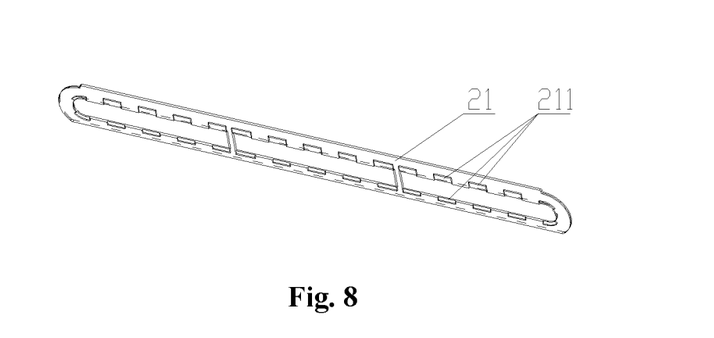
FIG. 8 is a structural diagram of a first substrate sheet in FIG. 7 in an upward view direction.
Figure 9:
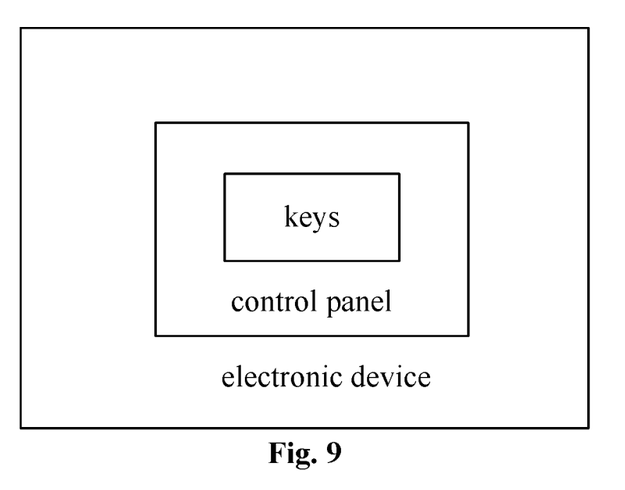
FIG. 9 is schematic diagram of an electronic device.

As shown in FIG. 7 and FIG. 8, FIG. 7 is a schematic structural diagram of a key according to an embodiment of the disclosure; and FIG. 8 is a structural diagram of a first substrate sheet in FIG. 7 in an upward view direction. In the solution, multiple first grooves 211 extending upward from a bottom surface of an inside of the frame structure of the above first substrate sheet 21 are arranged at the bottom surface.

By adopting above structure, a top surface of the first substrate sheet 21 still keeps in contact with the key cap 1.

Multiple first grooves 211 arranged at the bottom surface of the first substrate sheet 21 further enlarge the space for accommodating the adhesive and further prevent the adhesive 3 from flowing out, that is, overflow of the adhesive 3 is avoided.

In the specific solution, a cross section of the above first groove 211 may be rectangular. A square wave shaped structure is formed on the bottom surface of the inside of the frame structure of the first substrate sheet 21. The square wave shaped structure has characteristics of a more accommodation for the adhesive, a simple structure and an easy process. Of course, the first groove 211 may also be set as many other shapes such as an arc or a wave.

In another specific solution, multiple second grooves extending downward from a top surface of the second substrate sheet 22 corresponding to an inside of the frame structure of the first substrate sheet 21 are arranged at the top surface.

By adopting above structure, the multiple second grooves can accommodate more adhesive 3 and further prevent the adhesive 3 from flowing out which caused by mutual extrusion among the first substrate sheet 21, the second substrate sheet 22 and the key cap 1 and overflow of the adhesive is avoided.

In the specific solution, a cross section of the second groove may be rectangular. A square wave shaped structure is formed on the top surface of the second substrate sheet 22 corresponding to the inside of the frame structure of the first substrate sheet 21. The square wave shaped structure has characteristics of a more accommodation for the adhesive, a simple structure and an easy process. Of course, the second groove may also be set as many other shapes such as an arc or a wave.

In a more specific solution, as shown in FIG. 2, the above adhesive 3 includes a first adhesive 31 and a second adhesive 32. The first adhesive 31 is arranged between the first substrate sheet 21 and the second substrate sheet 22. The second adhesive 22 is arranged inside the frame structure of the first substrate sheet 21.

By adopting above structure, in an adhesive attaching process, firstly, the first substrate sheet 21, the first adhesive 31 and the second substrate sheet 22 may be adhesively attached to form the substrate 2, as shown in FIG. 4. Then the second adhesive 32 is arranged at the hollow part inside the frame structure of the first substrate sheet 21. And then the key cap 1 is adhesively attached to the hollow part of the first substrate sheet 21 to form the key, as shown in FIG. 5 and FIG. 6. The second adhesive 32 can well adhesively attach the key cap 1 and an inside of the frame structure of the substrate 2. In view of this, strength of the substrate 2 may be ensured by adopting double substrate sheets and close adhesive attaching of the key is implemented by double layer adhesives 3.

It should be noted that selection of the above first adhesive 31 and the second adhesive 32 is various, for example a solid adhesive such as a double faced adhesive may be used, a liquid adhesive such as a glue may be used and a hot melt adhesive which is solid in a normal temperature and liquid when be heated may be used.

Of course, the above adhesive 3 is not limited to the above two parts. The adhesive 3 may also only be arranged on the top surface of the second substrate sheet 22 and then the first substrate sheet 21 is adhesively attached to the second substrate sheet 22 to form the substrate 2, and then the key cap 1 is adhesively attached to the substrate 2.

In a more specific solution, as shown in FIG. 2, the first adhesive 31 is a solid adhesive film. The adhesive film has a frame structure matched with a shape of the first substrate sheet 21. Multiple concave parts 311 concaving outward are arranged at an inside of the frame structure of the adhesive film.

By adopting above structure, the shape of the adhesive film is matched with the shape of the first substrate sheet 21, the first adhesive 31 may better adhesively attach edges of the first substrate sheet 21 and the second substrate sheet 22. The multiple concave parts 311 arranged at the inside of the frame structure of the adhesive film make the inside of the frame structure of the first adhesive 31 accommodate more adhesives and further prevent the second adhesive 32 from flowing out caused by downward extrusion of the key cap 1, and overflow of the second adhesive 32 is avoided.

Particularly, the concave part 311 may be rectangular. That is, a square wave shaped structure is formed on the inside of the frame structure of the first adhesive 31. The square wave shaped structure has characteristics of a more accommodation for the adhesive, a simple structure and an easy process. Of course, the concave part 311 may also be set as many other shapes such as an arc or a wave.

In addition, an electronic device is further provided according to the disclosure, which includes a control panel and a key arranged on the control panel. The key adopts the above key of the electronic device.

As the above key of the electronic device has the above technical effect, so the electronic device applying the key has the same technical effect, which is not described here.

Above all, the electronic device and the key of the electronic device according to the disclosure are specifically illustrated. The disclosure applies specific examples to illustrate a principle and embodiments of the disclosure. The above description of the embodiments is only used to help understanding a method and a core idea of the disclosure. It should be noted that, for those skilled in the art, changes and modifications may be made to the disclosure without departing from the spirit or scope of the disclosure. The changes and modifications fall in the protection scope of the claims of the disclosure.

The invention claimed is:

1. A key of an electronic device, comprising a key cap and a substrate arranged under the key cap, wherein the key cap and the substrate are formed separately, and the substrate is adhesively attached to an underside of the key cap with an adhesive;

wherein the substrate is a carbon fiber substrate, a glass substrate, a rubber substrate or a plastics substrate;

the substrate comprises a first substrate sheet and a second substrate sheet arranged under the first substrate sheet, the first substrate sheet has a frame structure with a hollow part, the key cap is matched with the hollow part, and the key cap, the first substrate sheet and the second substrate sheet are adhesively attached with the adhesive;

the adhesive comprises a first adhesive and a second adhesive, the first adhesive is arranged between the first substrate sheet and the second substrate sheet, and the second adhesive is arranged inside the frame structure of the first substrate sheet; and the first adhesive is a solid adhesive film, the adhesive film has a frame structure matched with a shape of the first substrate sheet, a plurality of concave parts concaving outward are arranged at an inside of the frame structure of the adhesive film.

2. The key of the electronic device according to claim 1, wherein the first substrate sheet and the second substrate sheet are made of a same material or made of different materials.

3. The key of the electronic device according to claim 1, wherein a cross section of each of the concave parts is rectangular, and a square wave shaped structure is formed on the inside of the frame structure of the first adhesive.

4. The key of the electronic device according to claim 1, wherein a plurality of first grooves extending upward from a bottom surface of an inside of the frame structure of the first substrate sheet are arranged at the bottom surface.

5. The key of the electronic device according to claim 4, wherein a cross section of each of the first grooves is rectangular, and a square wave shaped structure is formed on the bottom surface of the inside of the frame structure of the first substrate sheet.

6. The key of the electronic device according to claim 1, wherein a plurality of second grooves extending downward from a top surface of the second substrate sheet corresponding to an inside of the frame structure of the first substrate sheet are arranged at the top surface.

7. The key of the electronic device according to claim 6, wherein a cross section of each of the second grooves is rectangular, and a square wave shaped structure is formed on the top surface of the second substrate sheet corresponding to the inside of the frame structure of the first substrate sheet.

8. An electronic device comprising a control panel and a key arranged on the control panel, wherein the key comprises a key cap and a substrate arranged under the key cap, wherein the key cap and the substrate are formed separately, and the substrate is adhesively attached to an underside of the key cap with an adhesive;
   wherein the substrate is a carbon fiber substrate, a glass substrate, a rubber substrate or a plastics substrate;
   the substrate comprises a first substrate sheet and a second substrate sheet arranged under the first substrate sheet, the first substrate sheet has a frame structure with a hollow part, the key cap is matched with the hollow part, and the key cap, the first substrate sheet and the second substrate sheet are adhesively attached with the adhesive; and
   the adhesive comprises a first adhesive and a second adhesive, the first adhesive is arranged between the first substrate sheet and the second substrate sheet, and the second adhesive is arranged inside the frame structure of the first substrate sheet; and
   the first adhesive is a solid adhesive film, the adhesive film has a frame structure matched with a shape of the first substrate sheet, a plurality of concave parts concaving outward are arranged at an inside of the frame structure of the adhesive film.

9. The electronic device according to claim 8, wherein the first substrate sheet and the second substrate sheet are made of a same material or made of different materials.

10. The electronic device according to claim 8, wherein a cross section of each of the concave parts is rectangular, and a square wave shaped structure is formed on the inside of the frame structure of the first adhesive.

11. The electronic device according to claim 8, wherein a plurality of first grooves extending upward from a bottom surface of an inside of the frame structure of the first substrate sheet are arranged at the bottom surface.

12. The electronic device according to claim 11, wherein a cross section of each of the first grooves is rectangular, and a square wave shaped structure is formed on the bottom surface of the inside of the frame structure of the first substrate sheet.

13. The electronic device according to claim 8, wherein a plurality of second grooves extending downward from a top surface of the second substrate sheet corresponding to an inside of the frame structure of the first substrate sheet are arranged at the top surface.

14. The electronic device according to claim 13, wherein a cross section of each of the second grooves is rectangular, and a square wave shaped structure is formed on the top surface of the second substrate sheet corresponding to the inside of the frame structure of the first substrate sheet.

\* \* \* \* \*